Feb. 3, 1931.    R. C. HAMBLEN    1,791,311
OUTLET BOX CLAMP
Filed Oct. 17, 1925    2 Sheets-Sheet 1

Inventor
Raymond C. Hamblen
By W. W. Williamson
Atty

Feb. 3, 1931.　　　R. C. HAMBLEN　　　1,791,311
OUTLET BOX CLAMP
Filed Oct. 17, 1925　　　2 Sheets-Sheet 2

Inventor
Raymond C. Hamblen
By Williamson

Patented Feb. 3, 1931

1,791,311

UNITED STATES PATENT OFFICE

RAYMOND C. HAMBLEN, OF GLASSBORO, NEW JERSEY

OUTLET-BOX CLAMP

Application filed October 17, 1925. Serial No. 62,951.

My invention relates to a new and useful improvement in clamps for outlet boxes, and has for its object to provide an exceedingly simple and effective device of this description, by which the ordinary or standard outlet box may be firmly secured in place, without depending upon screws driven in the laths or plaster of the wall upon which the outlet box is mounted.

A further object of my invention is to so construct a clamp that it may be readily inserted on the inside of the plaster or board wall thru the opening into which the outlet box is to be fitted, and then be held in proper position while said outlet box is being secured thereto by mechanical screws.

With these and other ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Figure 1:
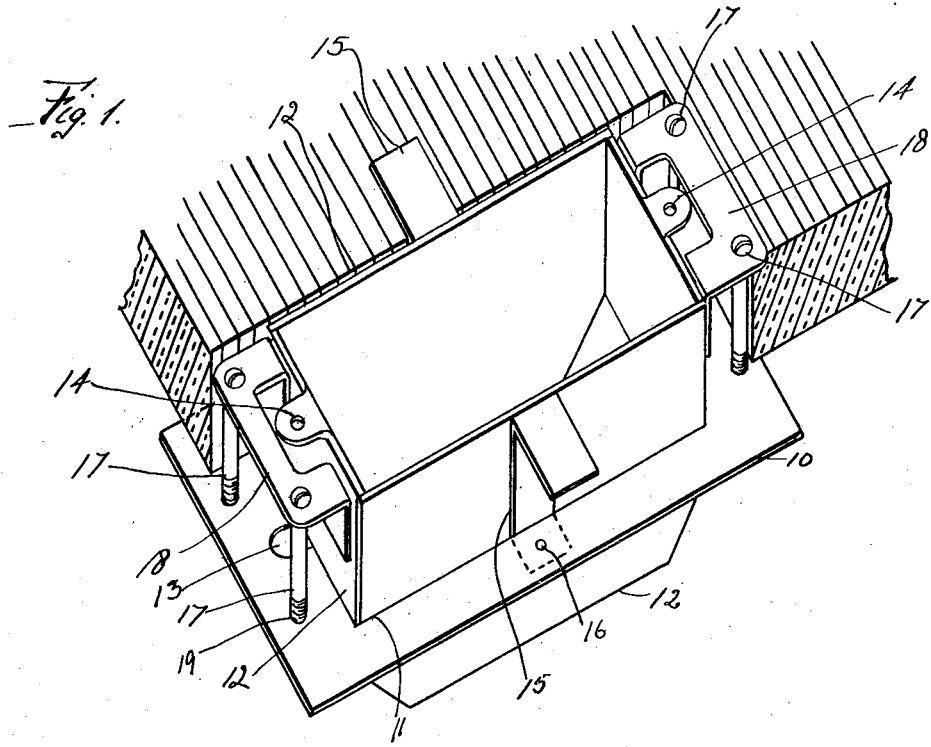
Fig. 1, is a perspective of an outlet box secured in place to a plaster wall by my improved plan, a portion of the wall being broken away to clearly show the relative position of the clamp and box.

In carrying out my invention as herein embodied, 10 represents the clamp which is preferably in the form of a rectangular plate having an opening 11 thru the center of sufficient size to permit the insertion of the outlet box 12. This plate also has the notches 13 formed therein to give clearance for the screws threaded thru the holes 14 in securing the ordinary face plate or escutcheon to the outlet box.

To the inner face of the clamp 10 is secured the ends of the holding strips 15 by means of the rivets 16, and these strips are preferably of thin ductile material, such as soft steel or copper, and are of sufficient length to permit the insertion of the clamp thru the opening in the wall in which the outlet box is to be mounted, and after this insertion to permit the proper manipulation of the clamp so that it may be brought into position on the inner face in the surface of the wall to register with the opening so that when the clamp box is inserted thru the opening in the wall, it will also pass thru the opening in the clamp.

Figure 2:
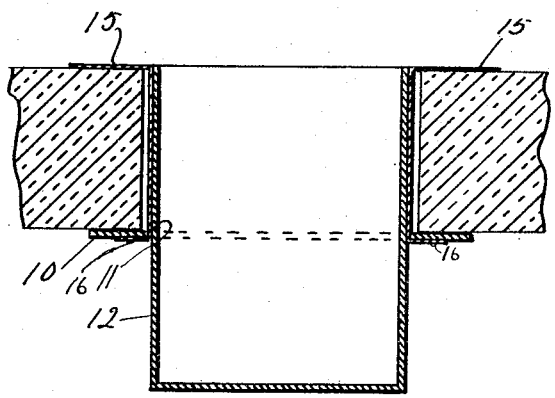
Fig. 2, is a cross section of the box with the clamp in its relative position.
Figure 4:
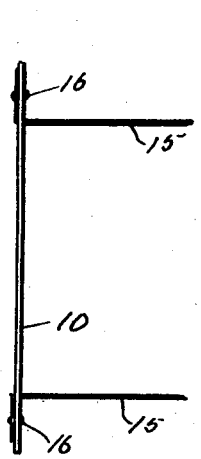
Fig. 4, is an end view of Fig. 3.
Figure 3:
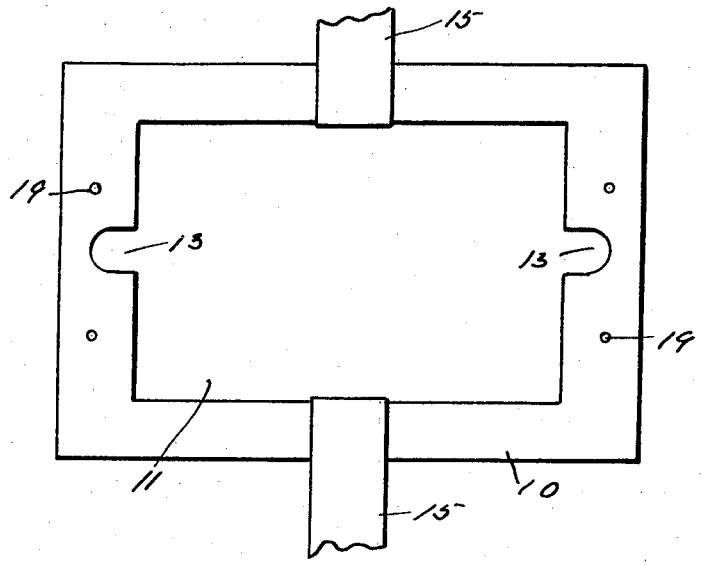
Fig. 3, is a face view of the clamp showing the strips for initially holding the clamp in position while the outlet box is being secured thereto.

When this has been done the bending over of the free ends of the holding strips 15 against the outer surface of the wall as indicated in Figs. 1 and 2 will maintain this clamping plate in proper position for the insertion of the outlet box and for the passage of the screws 17 thru the usual holes in the flanges 18 carried by this box and the threading of the inner ends of said screws into the threaded holes 19 in the clamp plate, thereby permitting the drawing up of the clamp plate against the inner surface of the wall and the binding of the flanges 18 against the laths or other surface of the wall as may be found desirable.

By the use of my improved clamp considerable time and labor are saved in mounting of outlet box, and said box when mounted is more rigid and less likely to be displaced by the giving away of the wood into which wood screws are fastened. Since the screws 17 used in drawing the flange 18 against the outer face of the surface of the wall and the clamp 10 against the inner surface of the wall may be of sufficient size and strength to provide for a considerable pressure being exerted upon the outer and inner surfaces of the wall by these members; and this has a further advantage of preventing the breaking down of the wall or the plaster thereof around the opening in which the outlet box is mounted.

When the clamp has been properly bound against the inner surface of the wall, the holding strips 15 may be either cut off or bent into the outlet box so that when the escutcheon or face plate is mounted over the box, these strips will be concealed.

Figure 5:
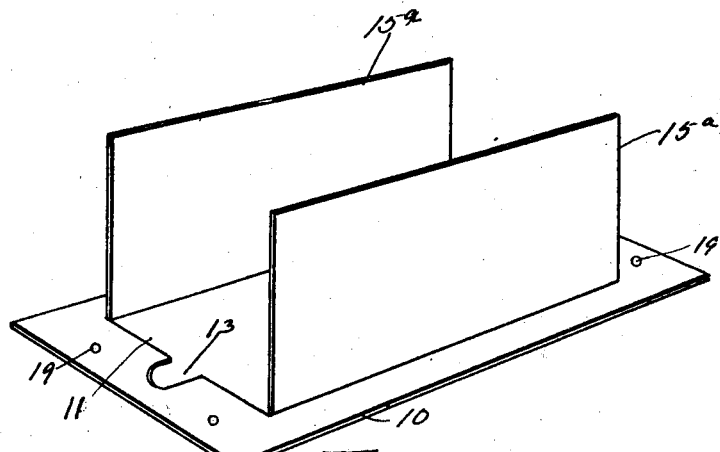
Fig. 5, is a perspective having a slightly modified form of the holding strips.

In Fig. 5, I have shown a slightly modified form of my invention in which the holding strips 15ª are of a width equal to the length of the center opening 11 in the clamp plate, and when this form of my invention is used the outer ends of these holding strips may be bent against the surface of the wall and surround them holding the clamp plate in position for the mounting of the outlet box or after the outlet box has been removed therefrom for any purpose, such as repairs or substitution.

Of course, I do not wish to be limited to the exact details of construction as herein shown as these may be varied within the limits of the appended claim without departing from the spirit of my invention.

Having thus fully described my invention, what I claim as new and useful is:—

A device of the kind described comprising a plate having a central opening therethrough, and strips secured to the rear face of said plate with their free ends projected through the opening and extending beyond the front face, said plate and holding strips being of metal of different physical characteristics.

In testimony whereof, I have hereunto affixed my signature.

RAYMOND C. HAMBLEN.